Patented Feb. 6, 1945

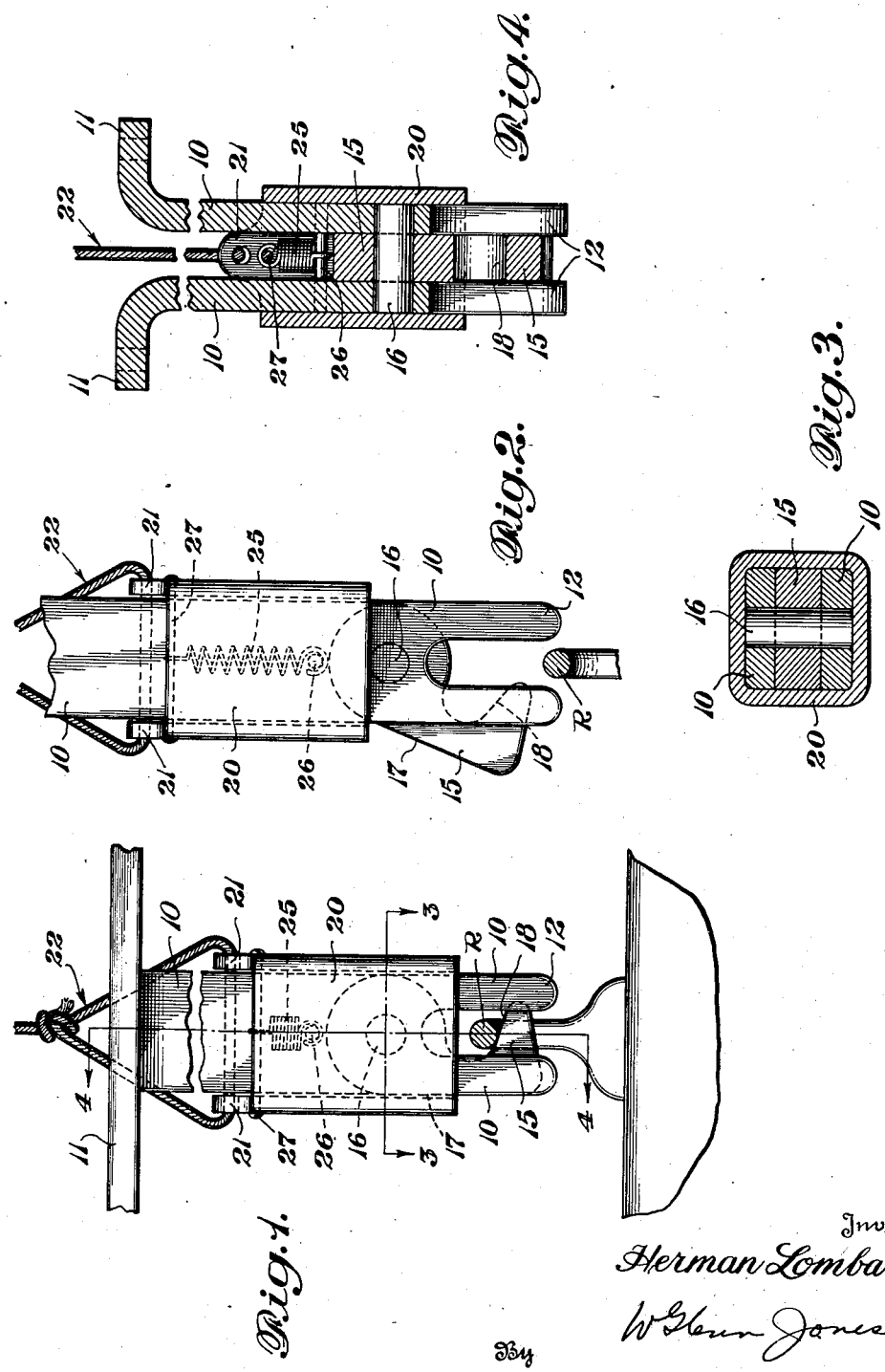

2,368,671

UNITED STATES PATENT OFFICE 2,368,671

RELEASE HANGER OR CONNECTOR

Herman Lombard, United States Navy

Application April 25, 1944, Serial No. 532,616

6 Claims. (Cl. 294—83)

(Granted under the act of March 3, 1883, as amended April 30, 1928; 370 O. G. 757)

This invention relates to a quick release hook of general utility and deals, more particularly, with a device of this character which is designed for use on aircraft as a hanger for droppable fuel tanks, bombs and the like.

A primary object of the invention is to provide a quick release hook of this character which is simple, foolproof and easily and quickly operated to release automatically the article supported by the hook.

Another object of the invention is to provide a quick release hook which is positively locked in its closed position in a manner whereby accidental or unintended movement of the hook to releasing position is prevented.

A further object of the invention is to provide a hook of the kind described which is of a simplified, unitary construction and embodies combined mounting means and article carrying means so designed as to require a minimum number of parts and relatively few operations in the manufacture thereof.

With such objects in view, as well as other advantages which may be incident to the use of the improvements, the invention consists of the parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawing, means for carrying the invention into practical effect, without limiting the improvements in their useful application to the particular construction and arrangement which, for the purpose of explanation, have been made the subject of illustration.

In the accompanying drawing:

Figure 1 is a side elevational view of the quick release hook of the invention showing the device in closed, article holding position;

Figure 2 is a similar view showing the hook in open releasing position;

Figure 3 is a sectional view of Figure 1 taken along line 3—3; and,

Figure 4 is a sectional view of Figure 1 taken along line 4—4.

In general, the quick release hook of the present invention is of a type designed to be installed on an airplane or other supporting structure in a manner whereby an object such as a droppable fuel tank may be readily mounted to the supporting structure in a minimum of time and effort, and yet easily and quickly released by a simple pull on a release cable, rod, or the like.

Referring now, more particularly, to the drawing, the hook of the invention is shown comprising a pair of spaced brackets 10 having apertured flanges 11 at one end by which the hook is mounted to a supporting structure by bolts, welding, or the like. The opposite ends of said brackets 10 are slotted to provide fingers 12, which together with the pivoted latch 15, define means for retaining an attaching ring or rod R connected with the object to be mounted.

The latch 15 is pivotally mounted between the brackets 10 by a pin 16, and is preferably of a design in which the rear edge 17 defines a bearing surface which is substantially flush with the adjacent edges of the brackets 10 in the closed position of the latch. The tongue portion of the latch preferably is designed with an inclined surface 18, extending generally downwardly in relation to said rear edge 17 of the latch.

A locking sleeve 120 is telescoped over the assembly comprising the brackets 10, and latch 15 pivoted therebetween. The sleeve includes ears 21, or the like, for the attachment of a release cable 22 extending in the space between the spaced brackets 10 to a position in which it may be pulled or otherwise actuated to draw the sleeve axially in effecting release of the hook. Thus, as shown in Figure 1, in the closed, holding position of the hook, the latch 15 is held in locked position by the sleeve 20 embracing the brackets 10 and engaging the rear edge 17 of the latch. The attaching rod or ring R, supporting the object mounted, rests on the inclined surface 18 of the latch tongue between the fingers 12 and is thereby positively retained in the closed position of the hook.

A coil spring 25 is disposed between the spaced brackets 10 and is connected at one end to a cross-pin 26, attached to said brackets. The other end of the spring 25 is connected to a cross-pin 27, secured to the sleeve, and, in this relation, maintains the sleeve in the closed position of the hook against accidental or unintended displacement.

The mounting of an article to be supported by the hook is accomplished substantially as illustrated in Figure 2. The locking sleeve 20 is moved upwardly as necessary to permit the latch 15 to pivot outwardly, whereupon the ring R attached to the object to be supported, is inserted into the space between the fingers 12 of the brackets 10. The latch 15 is returned to the location shown in Figure 1 and thereby defines with the fingers 12, a closure for the ring R in the closed holding position of the hook. The sleeve 20 is then returned to its initial position to lock the latch in such holding position of the hook.

While the latch 15 is positively retained in locked position by the sleeve 20 under influence of the coil spring 25, the spring readily yields under pull of the release cable 22 to permit axial movement of the sleeve to the position shown in Figure 2. Upon such movement of the sleeve upwardly out of engagement with the latch 15, the latch is free to pivot outwardly, as shown in Figure 2, to release the object supported. This action is automatically effected by the weight of the object supported by the rod or ring R which acts on the inclined surface 18 of the latch tongue in the manner of cam to cause the latch to move to its release position in the most expeditious manner.

An important advantage of the present invention resides in the compact construction of the hook in which there are no projecting parts and the elements of the device are more or less encased in the locking sleeve 20, and thereby protected against damage or possible fouling which could cause an accidental release of the hook. The disposition of the release cable 22 between the spaced brackets 10 is an exceptionally practical arrangement in this regard and otherwise provides a highly efficient construction for actuating the locking sleeve 20 easily and quickly in effecting release of the hook in a minimum of time and effort.

The invention has been described in connection with its use on aircraft as a quick release hanger for droppable fuel tanks, bombs and the like, but it will be quite apparent that it has equal utility in other devices or applications.

It will be understood, further, that the above description and accompanying drawing comprehend only the general and preferred embodiment of the invention and that various changes in the construction, proportion, arrangement and general combination of parts may be made without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

The invention described herein may be manufactured and used by or for the Government of the United States of America for governmental purposes without the payment of any royalties thereon or therefor.

What is claimed is:

1. A hook comprising a pair of spaced brackets provided with means for attaching the hook to a support, a latch pivotally mounted between said brackets, said latch having a tongue at one end defining a closure with said brackets in the closed position of the hook, a pivot adjacent the other end of the latch and a bearing surface defined by an edge of said latch between said tongue and pivot, a sleeve slidably telescoped over said brackets adapted to engage the bearing surface on said latch between its pivot and tongue to lock the latch in said closed position, and means connected to the sleeve extending between said spaced brackets for actuating said sleeve out of engagement with the latch to permit the latch to pivot to open position.

2. A hook comprising a pair of spaced brackets provided with means for attaching the hook to a support, a latch pivotally mounted between said brackets, said latch having a tongue at one end defining a closure with said brackets in the closed position of the hook, a pivot adjacent the other end of the latch, and a bearing surface defined by an edge of said latch between said tongue and pivot, a sleeve slidably telescoped over said brackets adapted to engage the bearing surface on said latch between its pivot and tongue to lock the latch in said closed position, a spring connected to the sleeve maintaining the sleeve in locking engagement with the latch in closed position, and means connected to the sleeve extending between said spaced brackets for actuating said sleeve out of engagement with the latch to permit the latch to pivot to open position.

3. A hook comprising a pair of spaced brackets provided with means for attaching the hook to a support, a latch pivotally mounted between said brackets defining a closure with said brackets in the closed position of the hook, a sleeve slidably telescoped over said brackets adapted to lock the latch in said closed position, means maintaining the sleeve in locking relation to the latch in closed position, and means connected to the sleeve extending between said spaced brackets for actuating said sleeve out of locking relation with the latch to permit the latch to pivot to open position.

4. A hook comprising a pair of spaced brackets provided with means for attaching the hook to a support, a latch pivotally mounted between said brackets defining a closure with said brackets in the closed position of the hook, a sleeve slidably telescoped over said brackets adapted to lock the latch in said closed position, a spring maintaining the sleeve in locking relation to the latch in closed position, and means connected to the sleeve extending between said spaced brackets for actuating said sleeve out of locking relation with the latch to permit the latch to pivot to open position.

5. A hook comprising a pair of spaced brackets provided with means for attaching the hook to a support, a latch pivotally mounted between said brackets defining a closure with said brackets in the closed position of the hook, a sleeve slidably telescoped over said brackets adapted to lock the latch in said closed position, a spring in the space between said brackets connected to a bracket and to the sleeve for maintaining said sleeve in locking relation to the latch in closed position, and means connected to the sleeve extending between said spaced brackets for actuating said sleeve out of locking relation with the latch to permit the latch to pivot to open position.

6. A hook comprising a pair of spaced brackets provided with means for attaching the hook to a support, a latch pivotally mounted between said brackets, said latch comprising a member having a tongue at one end defining a closure with said brackets in the closed position of the hook, a pivot adjacent the other end of the latch, and a bearing surface defined by an edge of said latch between said tongue and pivot, a sleeve slidably telescoped over said brackets adapted to engage the bearing surface on said latch between its pivot and tongue to lock the latch in said closed position, a spring connected to a bracket and to the sleeve for maintaining said sleeve in locking relation to the latch in closed position, and means connected to the sleeve extending between said spaced brackets for actuating said sleeve out of engagement with the latch to permit the latch to pivot to open position.

HERMAN LOMBARD.